United States Patent
Quan et al.

(10) Patent No.: US 12,294,473 B2
(45) Date of Patent: May 6, 2025

(54) SIGNAL PROCESSING METHOD AND RELATED DEVICES

(71) Applicant: SHENZHEN UNIVERSITY, Guangdong (CN)

(72) Inventors: Zhi Quan, Guangdong (CN); Can Pei, Guangdong (CN)

(73) Assignee: SHENZHEN UNIVERSITY, Guangdong (CN)

( * ) Notice: Subject to any disclaimer, the term of this patent is extended or adjusted under 35 U.S.C. 154(b) by 0 days.

(21) Appl. No.: 18/038,132

(22) PCT Filed: Nov. 23, 2020

(86) PCT No.: PCT/CN2020/130951
§ 371 (c)(1),
(2) Date: May 22, 2023

(87) PCT Pub. No.: WO2022/104807
PCT Pub. Date: May 27, 2022

(65) Prior Publication Data
US 2023/0421411 A1 Dec. 28, 2023

(51) Int. Cl.
H04L 25/02 (2006.01)
(52) U.S. Cl.
CPC .................. H04L 25/02 (2013.01)
(58) Field of Classification Search
CPC ..................... H04L 25/02; H04L 25/0262
(Continued)

(56) References Cited

U.S. PATENT DOCUMENTS 5,353,301 A * 10/1994 Mitzlaff ................ H04B 1/707
380/34
6,006,128 A * 12/1999 Izatt ...................... A61B 5/0073
600/476
(Continued)

FOREIGN PATENT DOCUMENTS

| CN | 103701731 A | 4/2014 |
| CN | 106130942 A | 11/2016 |

(Continued)

OTHER PUBLICATIONS

Kuchumov A.A. et al., "Advanced Algorithms for Automatic Symbol Rate Estimation of M-FSK and M-PSK Signals", (4 pages) (Jul. 31, 2017).

(Continued)

Primary Examiner — Emmanuel Bayard
(74) Attorney, Agent, or Firm — Scully, Scott, Murphy & Presser, P.C.

(57) ABSTRACT

A signal processing method and device are disclosed. The method include: receiving a first signal; processing the first signal to obtain a squared complex envelope of the first signal; obtaining a second signal by processing the squared complex envelope of the first signal using a first filter, where a cutoff frequency of the first filter is determined according to an average-to-peak power ratio of a squared complex envelope spectrum of a third signal, the third signal is obtained by processing the first signal using a second filter, and a cutoff frequency of the second filter is determined according to a bandwidth occupied by the first signal; determining a squared complex envelope spectrum of the second signal; and determining a symbol rate corresponding to the first signal according to the squared complex envelope spectrum of the second signal. As such, the symbol rate of the signal can be determined accurately.

20 Claims, 10 Drawing Sheets

(58) Field of Classification Search
USPC .......................................... 375/260, 346, 350
See application file for complete search history.

(56) References Cited

U.S. PATENT DOCUMENTS

| | | | |
|---|---|---|---|
| 7,376,204 B1* | 5/2008 | Music | H04L 25/0262 |
| | | | 375/316 |
| 7,602,834 B1 | 10/2009 | Giallorenzi et al. | |
| 9,724,016 B1* | 8/2017 | Al-Ali | A61B 5/0816 |
| 2005/0273482 A1* | 12/2005 | Moore | H03H 17/04 |
| | | | 708/300 |
| 2006/0052699 A1* | 3/2006 | Angelsen | G01S 7/52042 |
| | | | 600/437 |
| 2009/0097590 A1* | 4/2009 | McCallister | H03F 1/0261 |
| | | | 455/114.2 |
| 2012/0313680 A1* | 12/2012 | Kodama | H04B 1/1027 |
| | | | 327/157 |
| 2013/0215950 A1 | 8/2013 | Liao et al. | |
| 2016/0072652 A1* | 3/2016 | Wichlund | H04L 27/2334 |
| | | | 375/329 |
| 2016/0278648 A1* | 9/2016 | Vogel | A61B 5/72 |
| 2019/0124454 A1* | 4/2019 | Aschbacher | G10L 15/20 |

FOREIGN PATENT DOCUMENTS

| | | |
|---|---|---|
| CN | 108900445 A | 11/2018 |
| CN | 110324269 A | 10/2019 |
| CN | 111935046 A | 11/2020 |
| JP | 2008-131220 A | 6/2008 |

OTHER PUBLICATIONS

Yongjian S. et al., "Research on Sign Rate Estimation Method Based on Square Spectrum", Journal of Telanetry Tracking and Command 31(1):55-60 (Jan. 2010), together with an English-language translation.

Chinese Office Action dated Apr. 26, 2021 received in Chinese Application No. 202011323770.1.

International Search Report and Written Opinion dated Aug. 12, 2021 received in International Application No. PCT/CN2020/130951.

* cited by examiner

SIGNAL PROCESSING METHOD AND RELATED DEVICES

CROSS-REFERENCE TO RELATED APPLICATIONS

This application is a National Stage of International Application No. PCT/CN2020/130951, filed Nov. 23, 2020, the entire disclosure of which is hereby incorporated by reference.

TECHNICAL FIELD

This disclosure relates to the field of communication, and in particular to a signal processing method and related devices.

BACKGROUND

In non-collaborative communication systems, blind identification and blind demodulation of modulated signals have been the focus of research in software radio, spectrum detection, electronic interference and identification, etc. The symbol rate of the signal is a key parameter that needs to be determined for blind identification and blind demodulation of modulated signals, since the signal can be demodulated only when the symbol rate, carrier frequency, and modulation method of the signal are determined.

In wireless communication systems, radar systems, low-power Internet of things (IoT) and satellite communication systems, in order to save energy consumption of signal transmitters or to minimize the possibility of interception of military signals, these communication systems may choose unscheduled burst transmission as the communication method in many cases. For example, burst transmission is used in mobile cellular radio systems to minimize energy consumption in mobile television networks. In frequency hopping systems and some military communication systems, different modulation parameters are used between different burst signals to avoid signal interception and identification. Burst transmission is also necessary for low-power IoT communication systems. However, in these communication scenarios, the small number of symbols and low signal-to-noise ratio of the signal make it impossible to determine the symbol rate of the signal accurately. Therefore, how to accurately determine the symbol rate of the signal when the number of symbols is small and the signal-to-noise ratio is low is a technical problem that needs to be solved at this stage.

SUMMARY

Embodiments of the disclosure provide a signal processing method and device, which can determine the symbol rate of the signal accurately.

In a first aspect, a signal processing method is provided. The method includes: receiving a first signal; processing the first signal to obtain a squared complex envelope of the first signal; obtaining a second signal by processing the squared complex envelope of the first signal using a first filter, where a cutoff frequency of the first filter is determined according to an average-to-peak power ratio of a squared complex envelope spectrum of a third signal, the third signal is obtained by processing the first signal using a second filter, and a cutoff frequency of the second filter is determined according to a bandwidth occupied by the first signal; determining a squared complex envelope spectrum of the second signal; and determining a symbol rate corresponding to the first signal according to the squared complex envelope spectrum of the second signal.

In a second aspect, a signal processing device is provided. The device includes a receiving module, a first processing module, a second processing module, a first determining module, and a second determining module, where the receiving module is configured to receive a first signal; the first processing module is configured to process the first signal to obtain a squared complex envelope of the first signal; the second processing module is configured to obtain a second signal by processing the squared complex envelope of the first signal using a first filter, where a cutoff frequency of the first filter is determined according to an average-to-peak power ratio of a squared complex envelope spectrum of a third signal, the third signal is obtained by processing the first signal using a second filter, and a cutoff frequency of the second filter is determined according to a bandwidth occupied by the first signal; the first determining module is configured to determine a squared complex envelope spectrum of the second signal; and the second determining module is configured to determine a symbol rate corresponding to the first signal according to the squared complex envelope spectrum of the second signal.

In a third aspect, an electronic device for signal processing is provided, which includes a processor, a memory, a communication interface, and one or more programs, where the one or more programs are stored in the memory and generate instructions to be executed by the processor to perform the method of the first aspect.

In a fourth aspect, a computer-readable storage medium is provided, which is configured for storing a computer program, the stored computer program being executed by the processor to perform the method of the first aspect.

It can be seen that in the above technical solutions, a filter is used to process the squared complex envelope of the signal, so that the symbol rate can be determined based on the processed squared complex envelope spectrum of the signal. Due to the fact that the cutoff frequency of the filter is determined based on the average-to-peak power ratio of the squared complex envelope spectrum of the signal, it is possible to use the filter to process the squared complex envelope of the signal when the number of symbols in the signal is small and the signal-to-noise ratio is low, thereby filtering out interference signals and noise that cause inaccurate determination of the symbol rate. In this way, the symbol rate can be accurately determined based on the filtered squared complex envelope spectrum of the signal.

BRIEF DESCRIPTION OF THE DRAWINGS

In order to more clearly illustrate the technical solutions in the embodiments of the present disclosure or related art, the following is a brief description of the drawings required in the description of the embodiments or related art. It is obvious that the drawings in the following description are only some embodiments of the present disclosure, and other drawings can be obtained from these drawings without creative work for those of ordinary skill in the art.

DETAILED DESCRIPTION

The following will be a clear and complete description of the technical solutions in the embodiments of this disclosure in conjunction with the accompanying drawings in the embodiments of this disclosure. Obviously, the embodiments described are only some rather than all of the embodiments of this disclosure. Based on the embodiments in this disclosure, all other embodiments obtained by a person of ordinary skill in the art without creative work fall within the scope of protection of this disclosure.

The following gives a detail description.

The terms "first" and "second" in the specification, claims, and accompanying drawings are used to distinguish different objects and are not intended to describe a particular order. In addition, the terms "includes" and "comprises" and any variations thereof are intended to cover non-exclusive inclusion. For example, a process, method, system, product or apparatus including a series of steps or units is not limited to the listed steps or units, but optionally also includes steps or units that are not listed, or optionally also includes other steps or units that are inherent to those processes, methods, products or apparatus.

Figure 1:
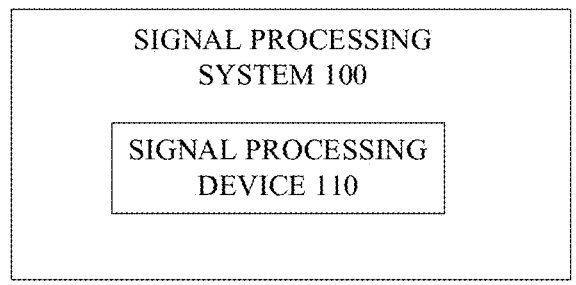
FIG. 1 is a schematic diagram of a signal processing system provided in an embodiment of the present disclosure.

First, referring to FIG. 1, FIG. 1 is a schematic diagram of a signal processing system provided in embodiments of the present disclosure. The signal processing system 100 includes a signal processing device 110. The signal processing device 110 is configured to receive and process signals. The signal processing system 100 may include an integrated monolithic device or multiple devices, and for ease of description, the present disclosure refers to the signal processing system 100 collectively as an electronic device. Obviously the electronic device may include a variety of handheld devices, automotive devices, wearable devices, or computing devices with wireless communication capabilities or other processing devices connected to a wireless modem, and various forms of user equipment (UE), mobile station (MS), terminal device, and so on.

It should be noted that the technical solution of this disclosure may be applied to long term evolution (LTE) architecture, the 5th generation mobile networks (5G), the 4.5 generation mobile networks (4.5G), wireless local area networks (WLAN) systems, radar systems, satellite communication systems, the Internet of Things, and so on. The technical solution of this disclosure may also be applied to other communication systems in the future, such as 6G communication system, etc. In the future communication system, the function may remain the same, while the name may be changed.

In addition, in wireless communication systems, radar systems, low-power IoT and satellite communication systems, in order to save energy consumption of signal transmitters or to minimize the possibility of interception of military signals, these communication systems may choose unscheduled burst transmission as the communication method in many cases. For example, burst transmission is used in mobile cellular radio systems to minimize energy consumption in mobile television networks. In frequency hopping systems and some military communication systems, different modulation parameters are used between different burst signals to avoid signal interception and identification. Burst transmission is also necessary for low-power IoT communication systems. However, in these communication scenarios, the small number of symbols and low signal-to-noise ratio of the signal make it impossible to determine the symbol rate of the signal accurately. Therefore, how to accurately determine the symbol rate of the signal when the number of symbols is small and the signal-to-noise ratio is low is a technical problem that needs to be solved at this stage.

Based on the above, the present disclosure proposes a signal processing method to solve the above problems, and the following is a detailed description of embodiments of the present disclosure.

Figure 2:
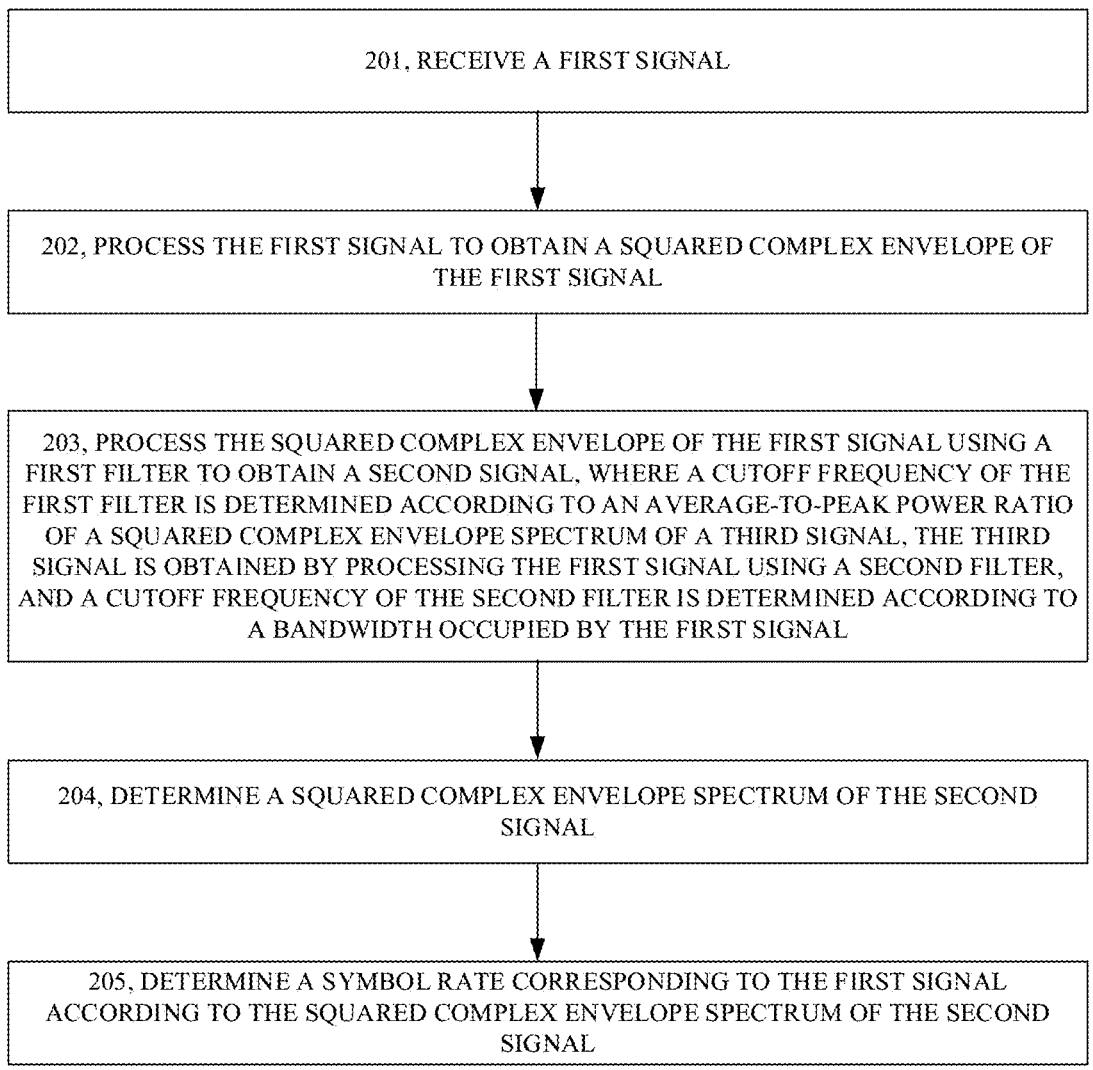
FIG. 2 is a schematic flowchart of a signal processing method provided in an embodiment of the present disclosure.

Referring to FIG. 2, FIG. 2 is a schematic flowchart of a signal processing method provided in embodiments of the present disclosure. The signal processing method may be applied to an electronic device. As shown in FIG. 2, the method includes but is not limited to the following steps.

At 201, receive a first signal.

Optionally, receiving the first signal includes receiving the first signal via a receiver.

It is to be noted that receiving the first signal via the receiver may be understood as receiving the first signal from the access network device via the receiver.

The access network device is an entity on the network side for transmitting signals, receiving signals, or transceiving signals. The access network device may be a device deployed in a radio access network (RAN) to provide wireless communication functions for electronic devices, for example, a transmission reception point (TRP), a base station, and various forms of control nodes, such as a network controller, a wireless controller, a wireless controller in a cloud radio access network (CRAN) scenario, etc. Specifically, the access network device may be various forms of macro base stations, micro base stations (also known as small stations), relay stations, access points (AP), radio network controller (RNC), node B (NB), base station controller (BSC), base transceiver station (BTS), home base station (e.g., home evolved nodeB, or home node B, HNB), BaseBand unit (BBU), transmitting and receiving point (TRP), transmitting point (TP), mobile switching center, etc., and may also be an antenna panel of the base station. The control node may connect multiple base stations and configure resources for multiple terminals within the coverage of multiple base stations. In systems using different radio access technologies, the name of the device with the base station function may be different. For example, the device may be an evolutional node B (eNB or eNodeB) in an LTE system, a wireless controller in a cloud radio access network (CRAN) scenario, or a gNB in 5G. Alternatively, the access network device may be a relay station, an access point, an in-vehicle device, a wearable device, and a network side device in the network after 5G or access network device in the future evolved PLMN network, etc. This disclosure does not limit the specific name of the access network device.

The first signal may be a modulated signal.

Optionally, the first signal may be one or more modulated signals, which is not limited in the present disclosure.

The first signal may be one or more single-carrier multi-decimal digitally modulated signals. Exemplarily, the first signal is a signal modulated using multiple phase shift keying (M-PSK). Alternatively, the first signal is a signal modulated using multiple quadrature amplitude modulation (M-QAM). In the present disclosure, the specific modulation method for the first signal is not limited herein.

At 202, process the first signal to obtain a squared complex envelope of the first signal.

Under a condition of smooth Gaussian white noise, the first signal satisfies the following formula: $x(t) = e^{-j2\pi f_c t} \sum_{i=-\infty}^{+\infty} s_i(t-iT_s) + n(t)$.

In the above, $x(t)$ represents the first signal, $f_c$ represents the carrier frequency of the first signal, and $s_i = c_i e^{j\phi_i}$, where $s_i$ represents a sequence of independently and identically distributed symbols with mean of 0 and variance of 1. $c_i$ represents an amplitude of a transmission symbol in the i-th symbol period, $\phi_i$ represents a phase of the signal, $h(t)$ represents a pulse shaping filter, TS represents the symbol period, and $n(t)$ represents the zero-mean Gaussian white noise.

Optionally, if $f_c=0$, then the first signal is a baseband signal. In this case, the squared complex envelope of the first signal is $|A(t)|$:

$$A(t) = \sum_{i=-\infty}^{+\infty} s_i(t-iT_s).$$

It should be noted that in the present disclosure, the algorithm for processing continuous signals is not supported for the first signal, i.e., it is not possible to process the first signal using the algorithm for processing continuous signals to obtain the symbol rate of the first signal.

Exemplarily, if $A(t) = \sum_{i=-\infty}^{+\infty} s_i(t-iT_s)$, then the symbol rate of the first signal cannot be obtained according to $$\hat{R}_s = \frac{1}{2\pi} \operatorname*{argmax}_{w \in (0,+\infty)} \left[ \int_{t=-\infty}^{\infty} |x(t)|^2 e^{-jwt} dt \right] = \frac{1}{2\pi} \operatorname*{argmax}_{w \in (0,+\infty)} \left[ \int_{t=-\infty}^{\infty} |A(t)|^2 e^{-jwt} dt \right],$$

where $\hat{R}_s$ is the symbol rate.

Figure 3:
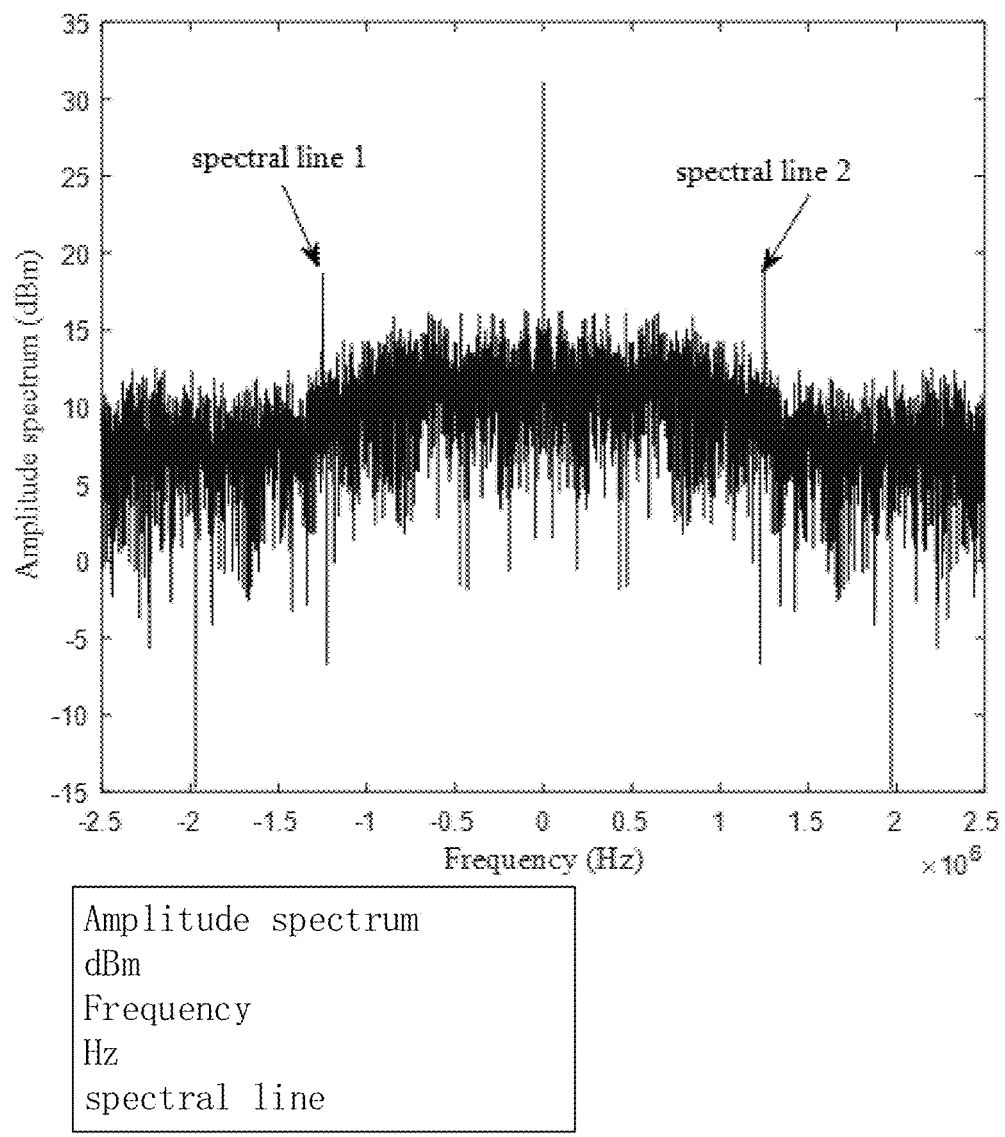
FIG. 3 shows a squared complex envelope spectrum of a 16-PSK signal with 1000 symbols.
Figure 4:
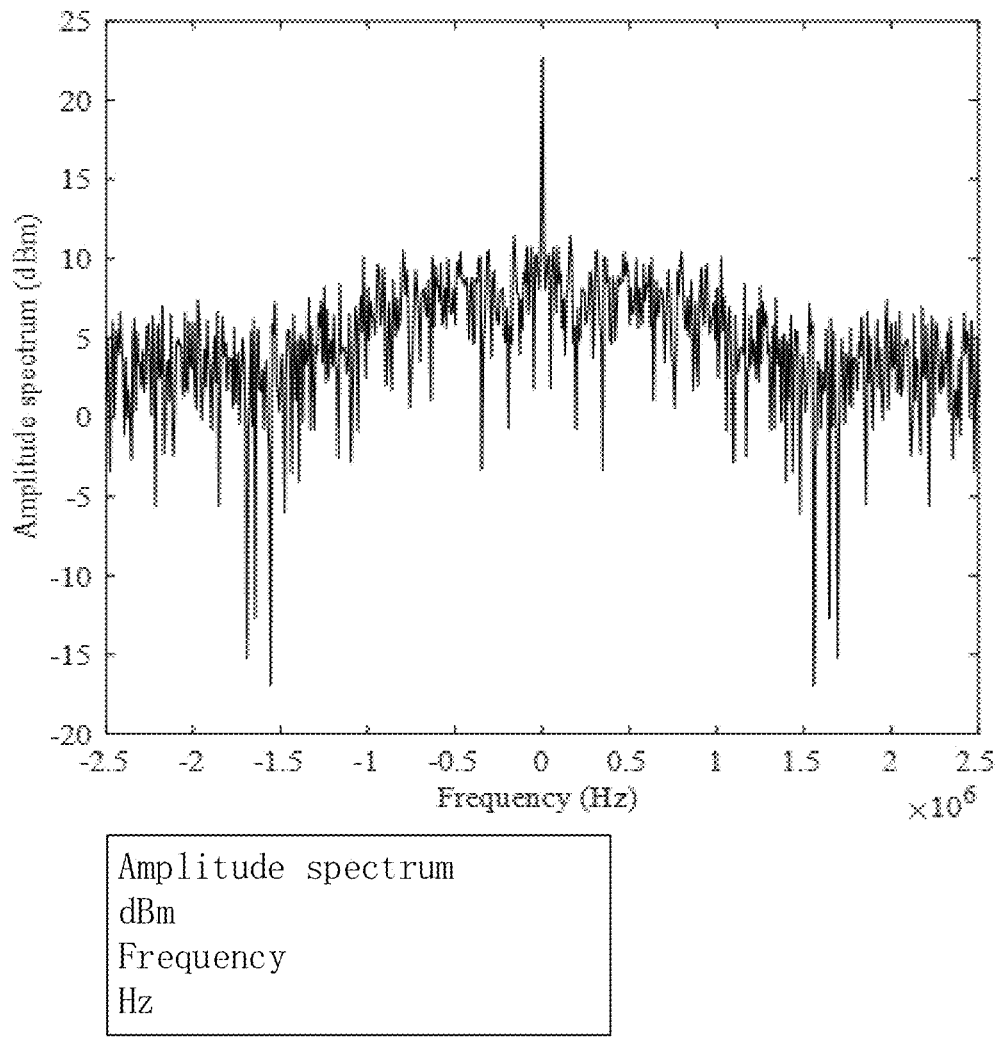
FIG. 4 shows a squared complex envelope spectrum of a 16-PSK signal with 200 symbols.

Specifically, taking a 16-PSK signal as an example, assume that the sampling frequency of the signal is 5 MHz, the true symbol rate is 1.25 Msym/s, the symbol energy-to-noise power ratio (Es/No) per symbol is equal to 10 dB, the number of samples per symbol is 4, and the roll-off factor of the pulse shaping filter is 0.35. Referring to FIG. 3, FIG. 3 shows the squared complex envelope spectrum for a 16-PSK signal with 1000 symbols. As shown in FIG. 3, the symbol rate spectral lines of the 16-PSK signal includes spectral line 1 and spectral line 2. Referring to FIG. 4, FIG. 4 shows the squared complex envelope spectrum for a 16-PSK signal with 200 symbols. As shown in FIG. 4, the symbol rate spectral lines of the 16-PSK signal are drowned by noise and difficult to identify.

It is understood that in the present disclosure, the number of symbols of the first signal is within a predetermined interval, which may be, for example, [50, 500].

At 203, process the squared complex envelope of the first signal using a first filter to obtain a second signal, where a cutoff frequency of the first filter is determined according to an average-to-peak power ratio of a squared complex envelope spectrum of a third signal, the third signal is obtained by processing the first signal using a second filter, and a cutoff frequency of the second filter is determined according to a bandwidth occupied by the first signal.

Optionally, before processing the squared complex envelope of the first signal using the first filter to obtain the second signal, the method further includes: performing Fourier transform on the first signal to obtain a first amplitude spectrum of the first signal; filtering the first amplitude spectrum using a third filter to obtain a second amplitude spectrum; determining a maximum value of the second amplitude spectrum; determining the bandwidth occupied by the first signal based on the maximum value of the second amplitude spectrum.

The first filter and the second filter are both digital band-pass filters, and a center frequency of the digital band-pass filters is the bandwidth occupied by the first signal.

Optionally, the bandwidth occupied by the first signal satisfies the following formula:

$$B_w = \max\left\{\arg\left[f : S(f)/S(m) = \frac{\sqrt{2}}{2}\right]\right\} - \min\left\{\arg\left[f : S(f)/S(m) = \frac{\sqrt{2}}{2}\right]\right\},$$

where $B_W$ represents the bandwidth occupied by the first signal, f represents the frequency of the first signal, S(f) represents the second amplitude spectrum, and S(m) represents the maximum value of the second amplitude spectrum.

It is understood that in the present disclosure, the bandwidth occupied by the first signal may be understood as an estimated bandwidth occupied by the first signal, that is, the estimated bandwidth occupied by the first signal may satisfy $$B_w = \max\left\{\arg\left[f : S(f)/S(m) = \frac{\sqrt{2}}{2}\right]\right\} - \min\left\{\arg\left[f : S(f)/S(m) = \frac{\sqrt{2}}{2}\right]\right\}.$$

Optionally, the cutoff frequency of the second filter includes a first cutoff frequency and a second cutoff frequency, where the first cutoff frequency is $$\frac{7B_w}{5f_s},$$

and the second cutoff frequency is $$\frac{12B_w}{5f_s},$$

where $f_s$ represents the sampling frequency of the first signal.

If the first pass-band cutoff frequency of the second filter is $f_1$ and the second pass-band cutoff frequency is $f_2$, then the bandwidth of the second filter is $f_2-f_1$. As can be understood, the first pass-band cutoff frequency is the lower pass-band cutoff frequency of the second filter, and the second pass-band cutoff frequency is the upper pass-band cutoff frequency of the second filter. In this case, $$u_1 = \frac{2f_1}{f_s} \text{ and } u_2 = \frac{2f_2}{f_s}.$$

In the above, $u_1$ is the first cutoff frequency, and $u_2$ is the second cutoff frequency. $u_1 < u_2$, $0 < u_1 < 1$, and $0 < u_2 < 1$. Understandably, it is possible to vectorize $u_1$ and $u_2$, i.e., $$u(1) = \frac{B_w}{f_s}\left[\frac{7}{5}, \frac{12}{5}\right]^T.$$

It should be noted that the cutoff frequency of the first filter is determined after iteration of the cutoff frequency of the second filter. That is, an initial cutoff frequency of the first filter is the cutoff frequency of the second filter, and the cutoff frequency of the first filter is the cutoff frequency corresponding to the minimum value of the average-to-peak power ratio of the squared complex envelope spectrum of the third signal after iteration.

The third filter may be a median filter, where the order of the median filter is a preset order, which may be, for example, any integer in [5, 30].

Exemplarily, the preset order is 10.

Optionally, the average-to-peak power ratio of the squared complex envelope spectrum of the third signal satisfies the following formula:

$$r(k)=r(k-1)+\hat{\varphi}(k)\Delta u(k)$$

where r(k) represents an average-to-peak power ratio of the squared complex envelope spectrum of the third signal at a k-th iteration, r(k−1) represents an average-to-peak power ratio of the squared complex envelope spectrum of the third signal at a (k−1)-th iteration, k is an integer greater than 1, $$\hat{\varphi}(k) = \hat{\varphi}(k-1) + \frac{\eta(\Delta r(k-1) - \hat{\varphi}(k-1)\Delta u(k-1))\Delta u(k-1)^T}{\mu(k-1) + \|\Delta u(k-1)\|^2},$$

$\eta$ is 2, $\mu(k) = \mu(k-1) - \beta_2\left[\frac{\partial J(\hat{\varphi}(k))}{\partial \hat{\varphi}(k)}\right]\left[\frac{\partial \hat{\varphi}(k)}{\partial \mu(k-1)}\right]^T$, $\beta_2$ is 0.05, $$\frac{\partial \hat{\varphi}(k)}{\partial \mu(k-1)} = -\frac{\eta(\Delta r(k-1) - \hat{\varphi}(k-1)\Delta u(k-1))\Delta u(k-1)^T}{(\mu(k-1) + \|\Delta u(k-1)\|^2)^2},$$

$$\frac{\partial J(\hat{\varphi}(k))}{\partial \hat{\varphi}(k)} = $$
$$2(\hat{\varphi}(k)\Delta u(k-1) - \Delta r(k-1))\Delta u(k-1)^T + 2\mu(k-1)(\hat{\varphi}(k) - \hat{\varphi}(k-1)),$$

$\Delta u(k) = u(k) - u(k-1)$, $\Delta u(k) \neq 0$, u(k) represents a cutoff frequency of the first filter at the k-th iteration, and u(k−1) represents a cutoff frequency of the first filter at the (k−1)-th iteration.

In the above, $\eta$ is the step size factor, and $\beta_2$ is the learning rate.

Understandably, $$\hat{\varphi}(k) = \hat{\varphi}(k-1) + \frac{\eta(\Delta r(k-1) - \hat{\varphi}(k-1)\Delta u(k-1))\Delta u(k-1)^T}{\mu(k-1) + \|\Delta u(k-1)\|^2}$$

may be derived from $$J(\hat{\varphi}(k)) = \|\Delta r(k-1) - \hat{\varphi}(k)\Delta u(k-1)\|^2 + \mu(k-1)\|\hat{\varphi}(k) - \hat{\varphi}(k-1)\|^2$$

and $\frac{\partial J(\hat{\varphi}(k))}{\partial \hat{\varphi}(k)} = 0$, where $\mu(k-1) \geq \mu_{min} = 1$.

In the above, $\Delta r(k-1)=r(k-1)-r(k-2)$, and reference on r(k−2) may be made to r(k), which is not repeated here. $\Delta u(k-1)=u(k-1)-u(k-2)$, and reference on u(k−2) may be made to u(k), which is not repeated here.

Optionally, if $\|\hat{\varphi}(k)\|^2 \leq \sigma$, or $\|\Delta u(k)\|^2 \leq \sigma$, or {sign $(\varphi_i(k)) \neq$ sign $(\varphi_i(1))\}_{i=1}^2$, then $\hat{\varphi}(k)=\hat{\varphi}(1)$, where $\hat{\varphi}(1)$ is an initial value of $\hat{\varphi}(k)$, and $\sigma=10^{-5}$.

Optionally, $$u(k) = u(k-1) + \frac{\rho \hat{\varphi}(k)^T (r^*(k) - r(k-1))}{\lambda(k-1) + \|\hat{\varphi}(k)\|^2},$$

where $\rho$ is 1, $$r^*(k) = 0.08,$$

$$\lambda(k) = \lambda(k-1) - \beta_1\left[\frac{\partial J(u(k))}{\partial u(k)}\right]^T\left[\frac{\partial u(k)}{\partial \lambda(k-1)}\right],$$

$$\beta_1 = 0.05,$$

$$\frac{\partial J(u(k))}{\partial u(k)} = 2(\hat{\varphi}(k)\Delta u(k) + r(k-1) - r^*(k))\hat{\varphi}(k)^T + 2\lambda(k-1)\Delta u(k), \text{ and}$$

$$\frac{\partial (u(k))}{\partial \lambda(k-1)} = -\frac{\rho \hat{\varphi}(k)^T (r^*(k) - r(k-1))}{(\lambda(k-1) + \|\hat{\varphi}(k)\|^2)^2}.$$

It should be noted that in this disclosure, if $u_1(k) > u_2(k)$, or $u_2(k) < r_c(k)$, or $u_1(k) > r_c(k)$, then $u_1(k)=u_1(k-1)$, and $u_2(k)=u_2(k-1)$, where $u_1(k)$ is the first cutoff frequency at the k-th iteration, and $u_1(k-1)$ is the first cutoff frequency at the (k−1)-th iteration. $u_2(k)$ is the second cutoff frequency at the k-th iteration, and $u_2(k-1)$ is the second cutoff frequency at the (k−1)-th iteration.

$$r_c(k)=(u_1(k)+u_2(k))/2.$$

It may be understood that $$u(k) = u(k-1) + \frac{\rho \hat{\varphi}(k)^T (r^*(k) - r(k-1))}{\lambda(k-1) + \|\hat{\varphi}(k)\|^2}$$

may be derived from $$r(k) = r(k-1) + \hat{\varphi}(k)\Delta u(k) \text{ and}$$

$$\frac{\partial J(u(k))}{\partial u(k)} = 0, \text{ where}$$

$$J(u(k)) = \|r^*(k) - r(k)\|^2 + \lambda(k-1)\|u(k) - u(k-1)\|^2, \text{ and}$$

$$\lambda(k-1) > 0.$$

In addition, $r(k)=r(k-1)+\hat{\varphi}(k)\Delta u(k)$ may be derived from $\Delta r(k)=\varphi(k)\Delta u(k)$.

$\varphi(k)=[\varphi_1(k), \varphi_2(k)]$, where $\varphi(k)$ is called the pseudo partial derivative (PPD) at the k-th iteration, $\|\varphi(k)\| \leq b$ are bounded for all k, and b is a positive integer. It is understood that $\hat{\varphi}(k)$ may be an estimated value of $\varphi(k)$.

Δr(k)=r(k)−r(k−1), Δu(k)=u(k)−u(k−1), Δu(k)≠0, and r(k)=f(r(k−1), . . . , r(k−$n_p$), u(k), . . . , u(k−$n_s$)).

It should be noted that for r(k)=f(r(k−1), . . . , r(k−$n_p$), u(k), . . . , u(k−$n_s$)), the following condition are satisfied: condition 1: r(k)=f(r(k−1), . . . , r(k−$n_p$), u(k), . . . , u(k−$n_s$)) is observable and controllable; condition 2: the partial derivatives of the function $f$ with respect to all u are continuous; condition 3: r(k)=f(r(k−1), . . . , r(k−$n_p$), u(k), . . . , u(k−$n_s$)) satisfies the generalized Lipschitz condition, i.e., for any k, |Δr(k)|≤b‖Δu(k)‖.

It can be seen that the bandwidth occupied by the first signal is determined in the above technical solution.

At 204, determine a squared complex envelope spectrum of the second signal.

Determining the squared complex envelope spectrum of the second signal includes performing Fourier transform on the second signal to obtain the squared complex envelope spectrum of the second signal.

At 205, determine a symbol rate corresponding to the first signal according to the squared complex envelope spectrum of the second signal.

Determining the symbol rate corresponding to the first signal according to the squared complex envelope spectrum of the second signal includes: extracting a spectral peak from the squared complex envelope spectrum of the second signal and determining the spectral peak as the symbol rate corresponding to the first signal.

Figure 5:
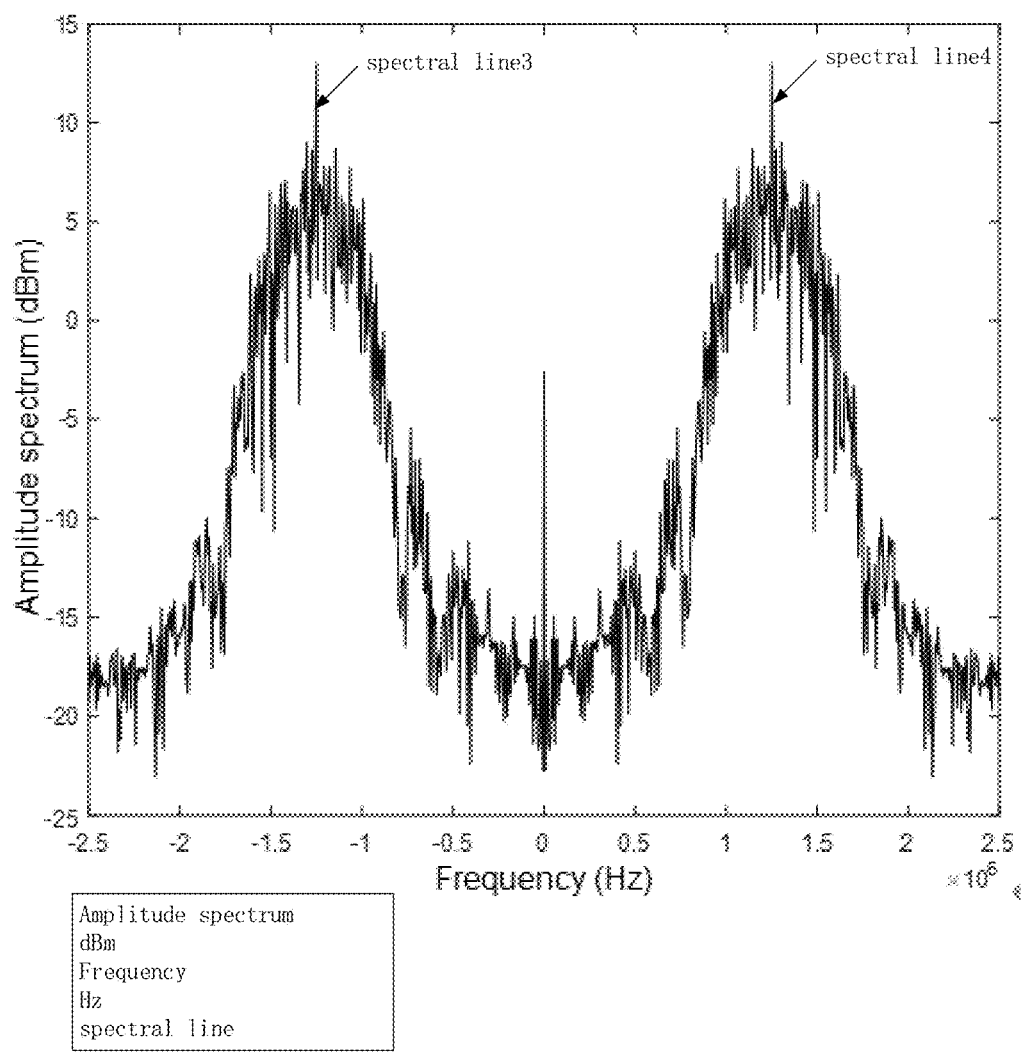
FIG. 5 shows another squared complex envelope spectrum in case of 200 symbols provided in an embodiment of the present disclosure.

The beneficial effects produced by the embodiments of the present disclosure are described below in conjunction with simulation results. Assume the number of symbols of the first signal is 200, the sampling frequency of the first signal is 5 MHz, the true symbol rate is 1.25 Msym/s, the roll-off factor of the pulse shaping filter is 0.35, and Es/No is equal to 10 dB. Referring to FIG. 5, FIG. 5 shows another squared complex envelope spectrum when the number of symbols is 200 provided in the embodiments of the disclosure. In combination with FIG. 5, it can be seen that when the process involved in the embodiments of the disclosure is performed, spectral line 3 and spectral line 4 may be obtained. i.e., the symbol rate may be determined accurately even when there are a small number of symbols.

Exemplarily, if μ(1)=1, λ(1)=2, σ=$10^{-5}$, ρ=1, η=2, $β_1=β_2$=0.05, the initial value $$\hat{\varphi}(1) = [-0.5, 0.2],$$

$$u(1) = \frac{B_w}{f_s}\left[\frac{7}{5}, \frac{12}{5}\right]^T,$$

$$\Delta u(1) = [0, 0]^T,$$

$$r(1) = 0.1,$$

$$r(2) = 0.125,$$

$$t_{max} = 50, \text{ and}$$

$$r^*(k) = 0.08.$$

Figure 6A:
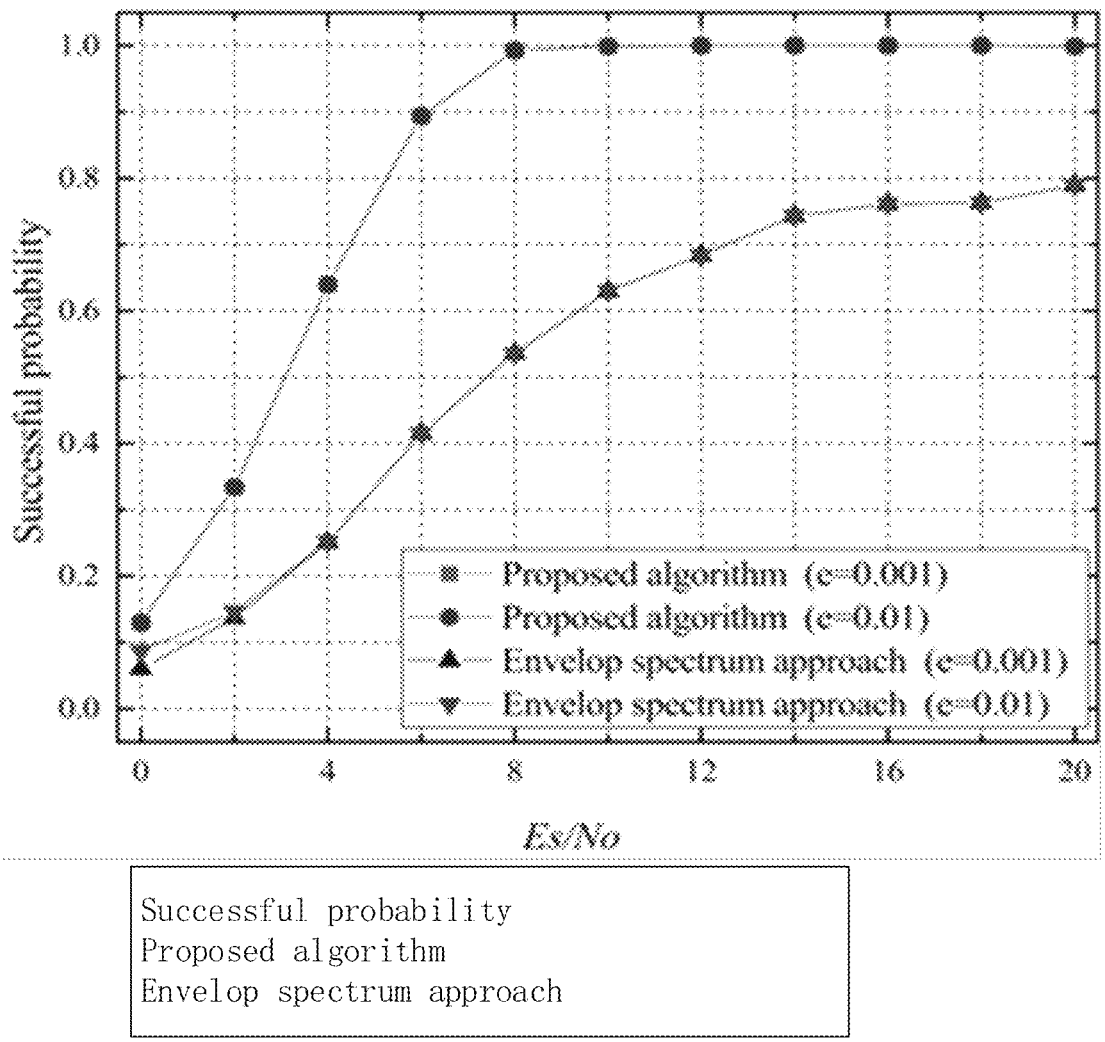
FIG. 6A shows a success probability of symbol rate estimation for 16-PSK signals at different Es/No provided in embodiments of the present disclosure.
Figure 6B:
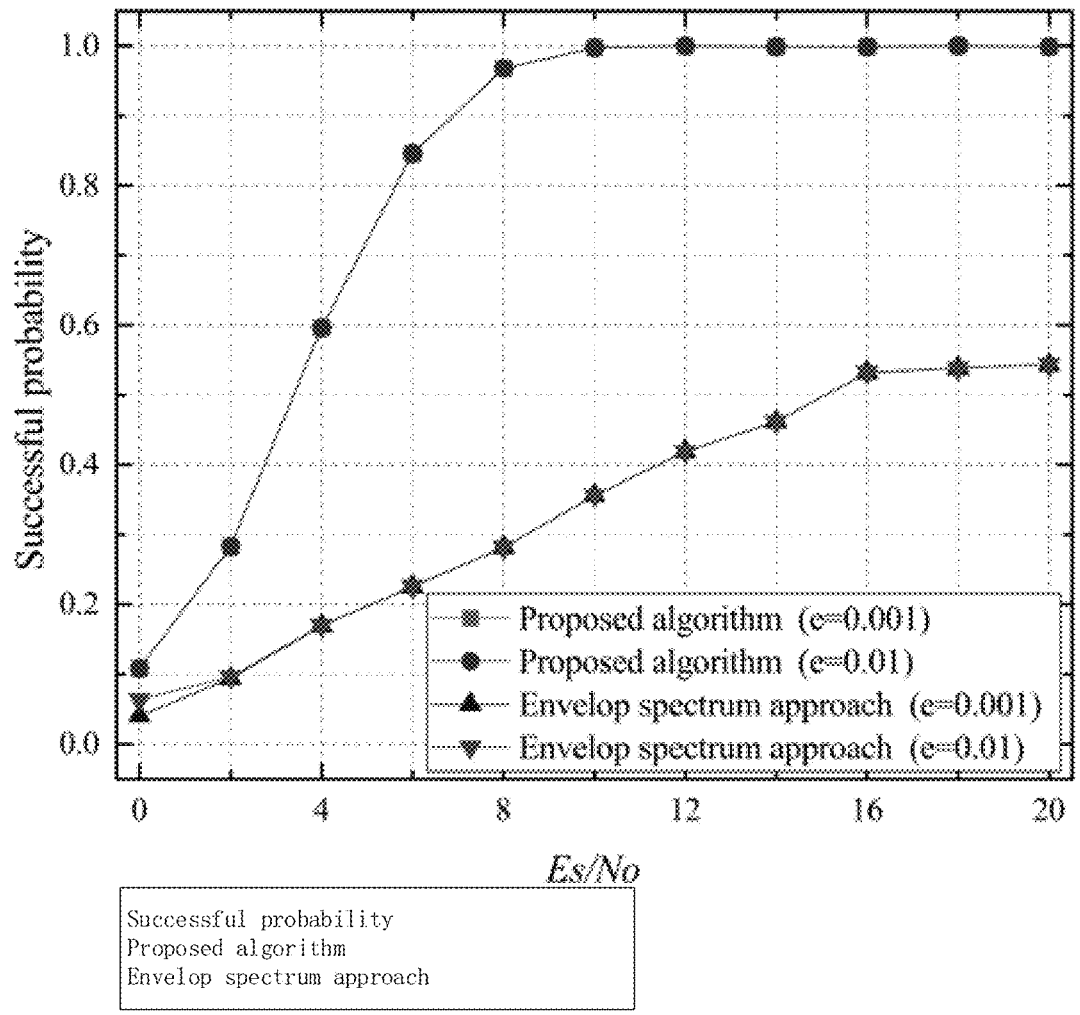
FIG. 6B shows a success probability of symbol rate estimation for 16-QAM signals at different Es/No provided in embodiments of the present disclosure.

Then in a case that the roll-off factor is 0.35 and the number of symbols of the first signal is 300, the success probability of the symbol rate estimation of a 16-PSK signal at different Es/No can be referred to FIG. 6A and the success probability of the symbol rate estimation of a 16-QAM signal at different Es/No can be referred to FIG. 6B. In a case that the roll-off factor is 0.35, Es/No is 10 dB, and the number of symbols of the first signal is less than 500, the success probability of the symbol rate estimation of the 16-PSK signal under different numbers of symbols can be referred to FIG. 7A, and the success probability of the symbol rate estimation of the 16-QAM signal under different numbers of symbols can be referred to FIG. 7B.

Specifically, FIG. 6A shows the success probability of symbol rate estimation of the 16-PSK signals at different Es/No provided in the embodiments of the disclosure, and FIG. 6B shows the success probability of symbol rate estimation of the 16-QAM signals at different Es/No provided in the embodiments of the disclosure. It can be seen from FIG. 6A and FIG. 6B that the success probability of symbol rate estimation of the proposed algorithm in the embodiments of the disclosure is higher than the success probability of symbol rate estimation of the existing scheme when Es/No and symbol rate estimation value are the same as the expected value (e).

Figure 7A:
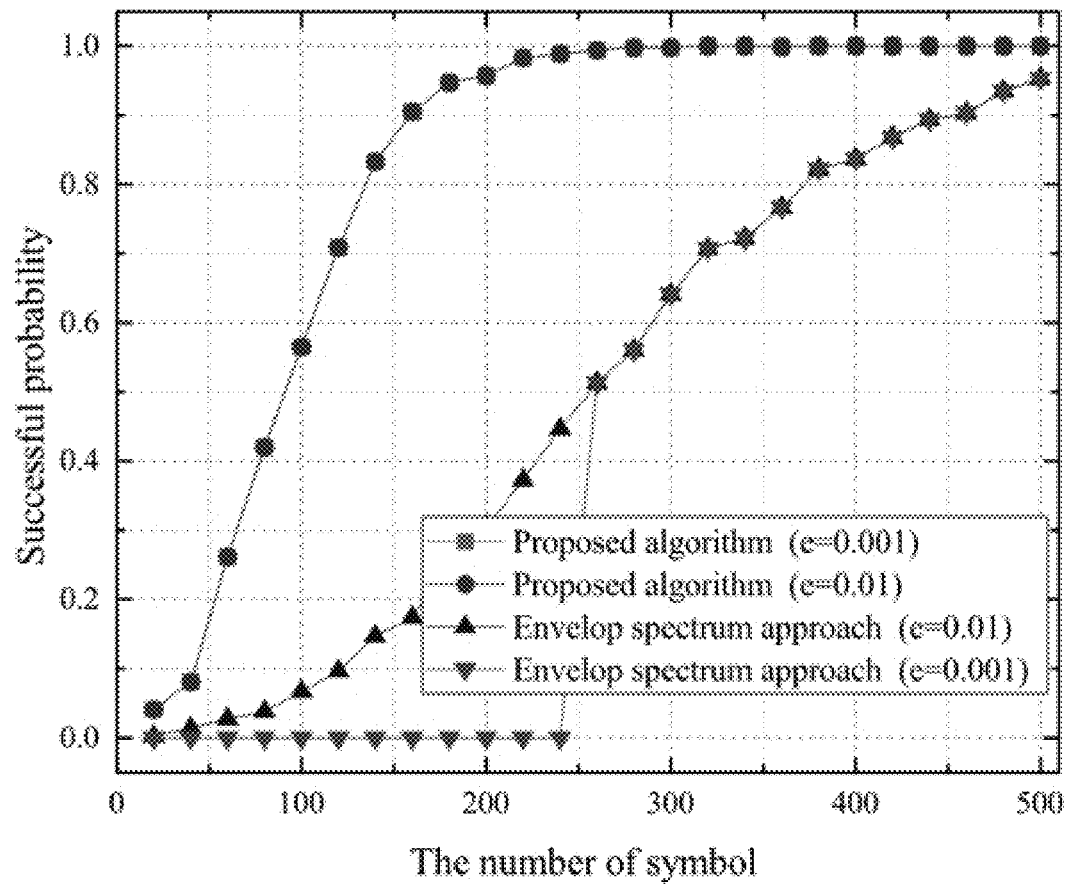
FIG. 7A shows a success probability of symbol rate estimation for 16-PSK signals at different numbers of symbols provided in embodiments of the present disclosure.
Figure 7B:
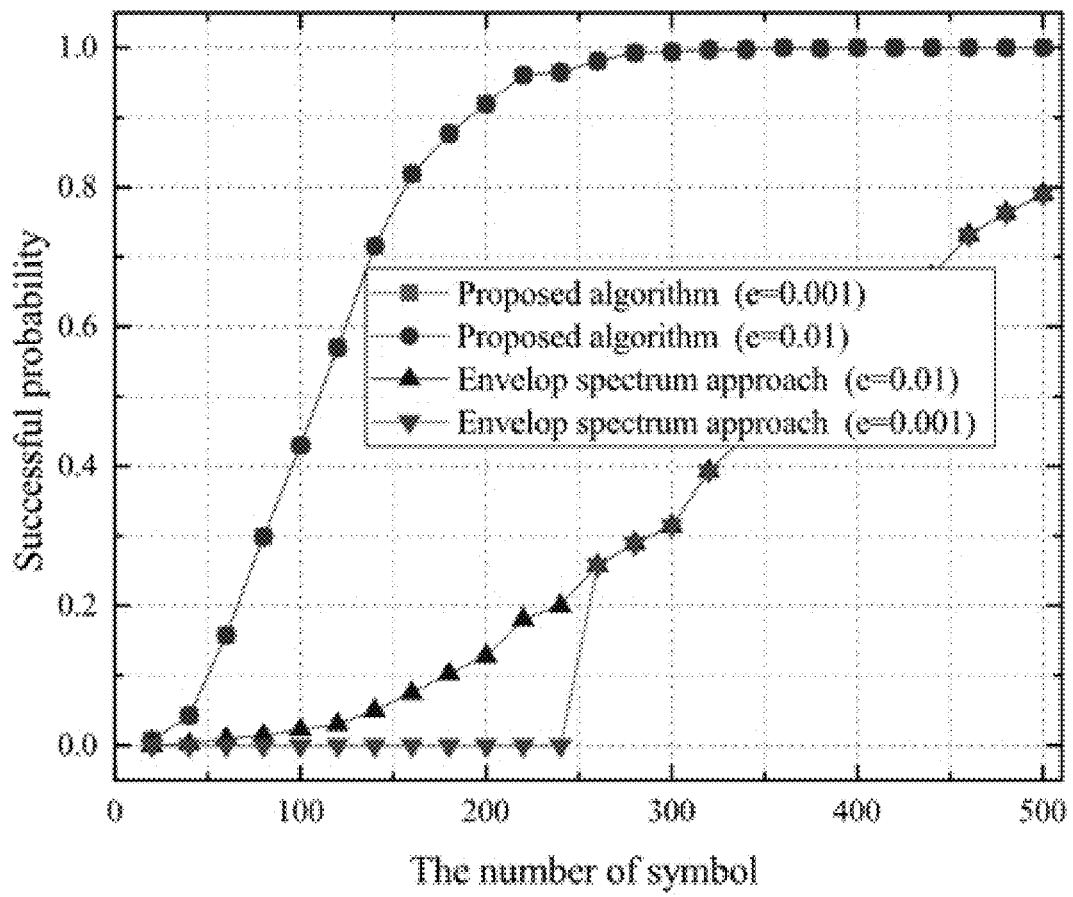
FIG. 7B shows a success probability of symbol rate estimation for 16-QAM signals at different numbers of symbols provided in embodiments of the present disclosure.

Specifically, FIG. 7A shows the success probability of symbol rate estimation for the 16-PSK signal at different numbers of symbols provided in the embodiments of the disclosure, and FIG. 7B shows the success probability of symbol rate estimation for the 16-QAM signal at different numbers of symbols provided in the embodiments of the disclosure. It can be seen from FIG. 7A that when the success probability of the symbol rate estimation is 0.8, the number of symbols required for the proposed algorithm in this disclosure is 150, and the number of symbols required for the existing scheme is at least 370. It can be seen from FIG. 7B that when the success probability of the symbol rate estimation is 0.8, the number of symbols required for the proposed algorithm in this disclosure is 160, and the number of symbols required for the existing scheme is at least 500. In addition, when the number of symbols is less than or equal to 240 and e is less than or equal to 0.001, the success probability of the symbol rate estimation in the existing scheme is 0, while the success probability of the symbol rate estimation in the proposed algorithm in the embodiments of the disclosure is greater than 0.95.

It should be noted that in the present disclosure, for the existing scheme, FIG. 6A to FIG. 7B show curves corresponding to the envelop spectrum approach. In FIG. 6A-FIG. 7B, the vertical coordinates are the success probability of the symbol rate estimation. Additionally, in FIG. 6A-FIG. 7B, the Monte Carlo method is used to calculate the success probability of effective estimation, and for each result the estimation accuracy is calculated using 5000 Monte Carlo simulation experiments.

As can be seen, in the above technical solution, the squared complex envelope of the signal is processed using a filter, so that the symbol rate can be determined based on the processed squared complex envelope spectrum of the signal. Due to the fact that the cutoff frequency of the filter is determined based on the average-to-peak power ratio of the squared complex envelope spectrum of the signal, it is possible to use the filter to process the squared complex envelope of the signal when the number of symbols in the signal is small and the signal-to-noise ratio is low, thereby filtering out interference signals and noise that cause inaccurate determination of the symbol rate. In this way, the symbol rate can be accurately determined based on the filtered squared complex envelope spectrum of the signal.

Figure 8:
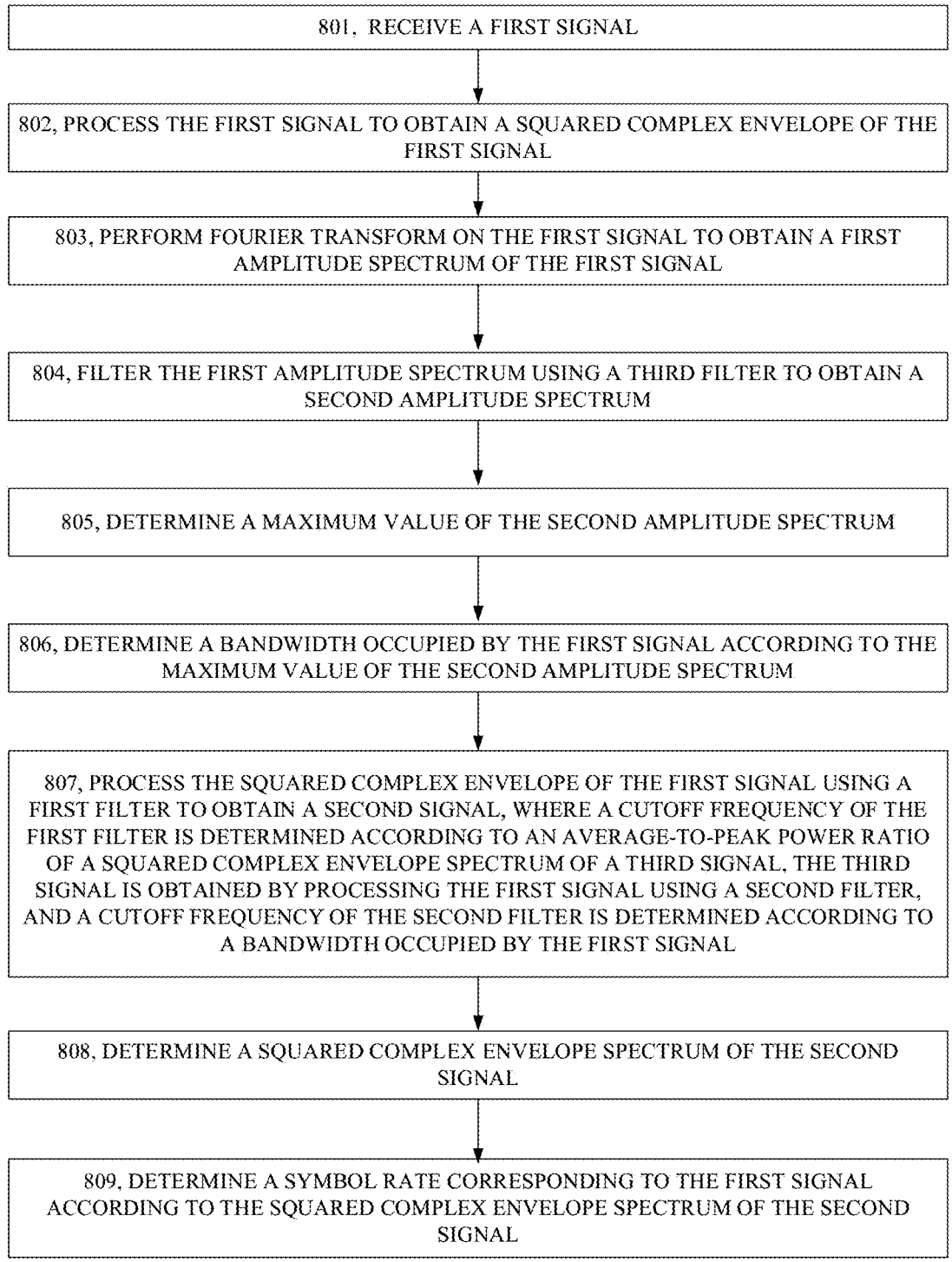
FIG. 8 is a schematic flowchart of another signal processing method provided in an embodiment of the present disclosure.

Referring to FIG. 8, FIG. 8 is a schematic flowchart of another signal processing method provided in an embodiment of the present disclosure. The signal processing method may be applied to the electronic device. As shown in FIG. 8, the method includes but is not limited to the following operations.

Operations at 801-802 are the same as operations at 201-202 in FIG. 2, which will not be repeated here.

At 803, perform Fourier transform on the first signal to obtain a first amplitude spectrum of the first signal.

804, filter the first amplitude spectrum using a third filter to obtain a second amplitude spectrum.

For the third filter, reference may be made to the relevant description above and will not be repeated here.

At 805, determine a maximum value of the second amplitude spectrum.

At 806, determine a bandwidth occupied by the first signal according to the maximum value of the second amplitude spectrum.

For the bandwidth occupied by the first signal, reference may be made to the relevant description above, which will not be repeated here.

Operations at 807-809 are the same as operations at 203-205 in FIG. 2, which will not be repeated here.

As can be seen, in the above technical solution, the squared complex envelope of the signal is processed using a filter, so that the symbol rate can be determined based on the processed squared complex envelope spectrum of the signal. Since the cutoff frequency of the filter is determined based on the average-to-peak power ratio of the squared complex envelope spectrum of the signal, it is possible to use the filter to process the squared complex envelope of the signal when the number of symbols in the signal is small and the signal-to-noise ratio is low, thereby filtering out interference signals and noise that cause inaccurate determination of the symbol rate. In this way, the symbol rate can be accurately determined based on the filtered squared complex envelope spectrum of the signal.

Figure 9:
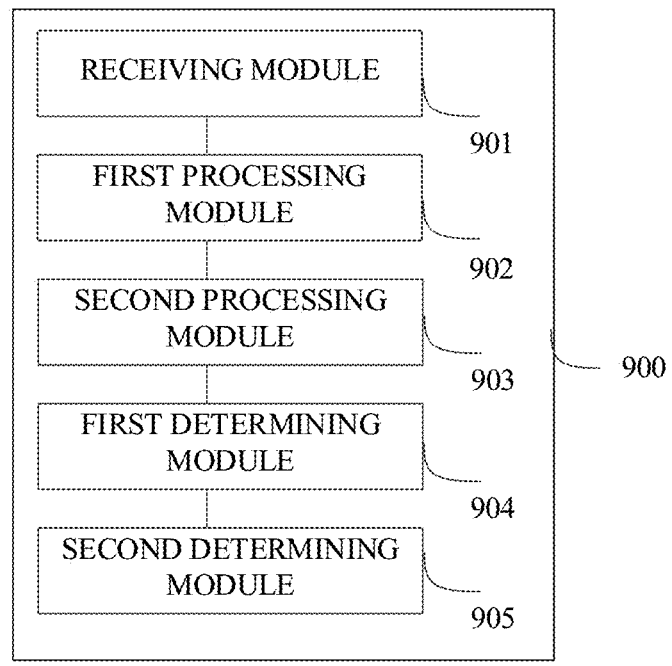
FIG. 9 shows a signal processing device provided in an embodiment of the present disclosure.

Referring to FIG. 9, FIG. 9 shows a signal processing device provided in an embodiment of the present disclosure. As shown in FIG. 9, the signal processing device 900 includes a receiving module 901, a first processing module 902, a second processing module 903, a first determining module 904, and a second determining module 905.

The receiving module 901 is configured to receive a first signal.

The first processing module 902 is configured to process the first signal to obtain a squared complex envelope of the first signal.

The second processing module 903 is configured to obtain a second signal by processing the squared complex envelope of the first signal using a first filter, where a cutoff frequency of the first filter is determined according to an average-to-peak power ratio of a squared complex envelope spectrum of a third signal, the third signal is obtained by processing the first signal using a second filter, and a cutoff frequency of the second filter is determined according to a bandwidth occupied by the first signal.

The first determining module 904 is configured to determine a squared complex envelope spectrum of the second signal.

The second determination module 905 is configured to determine a symbol rate corresponding to the first signal according to the squared complex envelope spectrum of the second signal.

For the reception of the first signal, reference may be made to the relevant description above, which will not be repeated here.

For the processing of the first signal to obtain the complex envelope of the first signal, reference may be made to the relevant description above, which will not be repeated herein.

Optionally, when the first filter is used to process the squared complex envelope of the first signal to obtain the second signal, the second processing module 903 is further configured to perform Fourier transform on the first signal to obtain a first amplitude spectrum of the first signal; to filter the first amplitude spectrum using a third filter to obtain a second amplitude spectrum; to determine a maximum value of the second amplitude spectrum; to determine a bandwidth occupied by the first signal according to the maximum value of the second amplitude spectrum.

The first filter and the second filter are both digital band-pass filters, and a center frequency of the digital band-pass filters is the bandwidth occupied by the first signal.

The first filter and the second filter are both digital band-pass filters, and a center frequency of the digital band-pass filters is the bandwidth occupied by the first signal.

Optionally, the bandwidth occupied by the first signal satisfies the following formula:

$$B_w = \max\left\{\arg\left[f:S(f)/S(m) = \frac{\sqrt{2}}{2}\right]\right\} - \min\left\{\arg\left[f:S(f)/S(m) = \frac{\sqrt{2}}{2}\right]\right\},$$

where $B_W$ represents the bandwidth occupied by the first signal, f represents the frequency of the first signal, S(f) represents the second amplitude spectrum, and S(m) represents the maximum value of the second amplitude spectrum. It is understood that in the present disclosure, the bandwidth occupied by the first signal may be understood as an estimated bandwidth occupied by the first signal, that is, the estimated bandwidth occupied by the first signal may satisfy:

$$B_w = \max\left\{\arg\left[f:S(f)/S(m) = \frac{\sqrt{2}}{2}\right]\right\} - \min\left\{\arg\left[f:S(f)/S(m) = \frac{\sqrt{2}}{2}\right]\right\}.$$

Optionally, the cutoff frequency of the second filter includes a first cutoff frequency and a second cutoff frequency, where the first cutoff frequency is $$\frac{7B_w}{5f_s},$$

and the second cutoff frequency is $$\frac{12B_w}{5f_s},$$

where $f_s$ represents the sampling frequency of the first signal.

If the first pass-band cutoff frequency of the second filter is $f_1$ and the second pass-band cutoff frequency is $f_2$, then the bandwidth of the second filter is $f_2-f_1$. As can be understood, the first pass-band cutoff frequency is the lower pass-band cutoff frequency of the second filter, and the second pass-band cutoff frequency is the upper pass-band cutoff frequency of the second filter. In this case $$u_1 = \frac{2f_1}{f_s} \text{ and } u_2 = \frac{2f_2}{f_s}.$$

In the above, $u_1$ is the first cutoff frequency, and $u_2$ is the second cutoff frequency. $u_1 < u_2$, $0 < u_1 < 1$, and $0 < u_2 < 1$. Understandably, it is possible to vectorize $u_1$ and $u_2$, i.e., $$u(1) = \frac{B_w}{f_s}\left[\frac{7}{5}, \frac{12}{5}\right]^T.$$

It should be noted that the cutoff frequency of the first filter is determined after iteration of the cutoff frequency of the second filter. That is, an initial cutoff frequency of the first filter is the cutoff frequency of the second filter, and the cutoff frequency of the first filter is the cutoff frequency corresponding to the minimum value of the average-to-peak power ratio of the squared complex envelope spectrum of the third signal after iteration.

The third filter may be a median filter, where the order of the median filter is a preset order, which may be, for example, any integer in [5, 30].

Exemplarily, the preset order is 10. Optionally, the average-to-peak power ratio of the squared complex envelope spectrum of the third signal satisfies the following formula:

$$r(k) = r(k-1) + \hat{\varphi}(k)\Delta u(k)$$

where r(k) represents an average-to-peak power ratio of the squared complex envelope spectrum of the third signal at a k-th iteration, r(k−1) represents an average-to-peak power ratio of the squared complex envelope spectrum of the third signal at a (k−1)-th iteration, k is an integer greater than 1, $$\hat{\varphi}(k) = \hat{\varphi}(k-1) + \frac{\eta(\Delta r(k-1) - \hat{\varphi}(k-1)\Delta u(k-1))\Delta u(k-1)^T}{\mu(k-1) + \|\Delta u(k-1)\|^2},$$

$\eta$ is 2, $$\mu(k) = \mu(k-1) - \beta_2 \left[\frac{\partial J(\hat{\varphi}(k))}{\partial \hat{\varphi}(k)}\right]\left[\frac{\partial \hat{\varphi}(k)}{\partial \mu(k-1)}\right]^T,$$

$\beta_2$ is 0.05, $$\frac{\partial \hat{\varphi}(k)}{\partial \mu(k-1)} = -\frac{\eta(\Delta r(k-1) - \hat{\varphi}(k-1)\Delta u(k-1))\Delta u(k-1)^T}{(\mu(k-1) + \|\Delta u(k-1)\|^2)^2},$$

$$\frac{\partial J(\hat{\varphi}(k))}{\partial \hat{\varphi}(k)} =$$

$$2(\hat{\varphi}(k)\Delta u(k-1) - \Delta r(k-1))\Delta u(k-1)^T + 2\mu(k-1)(\hat{\varphi}(k) - \hat{\varphi}(k-1)),$$

$$\Delta u(k) = u(k) - u(k-1), \Delta u(k) \neq 0,$$

u(k) represents a cutoff frequency of the first filter at the k-th iteration, and u(k−1) represents a cutoff frequency of the first filter at the (k−1)-th iteration.

In the above, η is the step size factor, and $\beta_2$ is the learning rate.

Understandably, $$\hat{\varphi}(k) = \hat{\varphi}(k-1) + \frac{\eta(\Delta r(k-1) - \hat{\varphi}(k-1)\Delta u(k-1))\Delta u(k-1)^T}{\mu(k-1) + \|\Delta u(k-1)\|^2}$$

may be derived from $$J(\hat{\varphi}(k)) = \|\Delta r(k-1) - \hat{\varphi}(k)\Delta u(k-1)\|^2 + \mu(k-1)\|\hat{\varphi}(k) - \hat{\varphi}(k-1)\|^2 \text{ and}$$

$$\frac{\partial J(\hat{\varphi}(k))}{\partial \hat{\varphi}(k)} = 0, \text{ where}$$

$$\mu(k-1) \geq \mu_{min} = 1.$$

In the above, $\Delta r(k-1) = r(k-1) - r(k-2)$, and reference on r(k−2) may be made to r(k), which is not repeated here. $\Delta u(k-1) = u(k-1) - u(k-2)$, and reference on u(k−2) may be made to u(k), which is not repeated here.

Optionally, if $\|\hat{\varphi}(k)\|^2 < \sigma$, or $\|\Delta u(k)\|^2 < \sigma$, or $\{\text{sign}(pi(k)) \neq \text{sign}(pi(1))\}_1$, then $\hat{\varphi}(k) = \hat{\varphi}(1)$, where $\hat{\varphi}(1)$ is an initial value of $\varphi(k)$, and $\sigma = 10^{-5}$.

Optionally, $$u(k) = u(k-1) + \frac{\rho \hat{\varphi}(k)^T(r^*(k) - r(k-1))}{\lambda(k-1) + \|\hat{\varphi}(k)\|^2}, \text{ where}$$

$\rho$ is 1, $r^*(k) = 0.08$, $$\lambda(k) = \lambda(k-1) - \beta_1\left[\frac{\partial J(u(k))}{\partial u(k)}\right]^T\left[\frac{\partial u(k)}{\partial \lambda(k-1)}\right], \beta_1 = 0.05,$$

$$\frac{\partial J(u(k))}{\partial u(k)} = 2(\hat{\varphi}(k)\Delta u(k) + r(k-1) - r^*(k))\hat{\varphi}(k)^T + 2\lambda(k-1)\Delta u(k), \text{ and}$$

$$\frac{\partial(u(k))}{\partial \lambda(k-1)} = -\frac{\rho \hat{\varphi}(k)^T(r^*(k) - r(k-1))}{(\lambda(k-1) + \|\hat{\varphi}(k)\|^2)^2}.$$

It should be noted that in this disclosure, if $u_1(k) > u_2(k)$, or $u_2(k) < r_c(k)$, or $u_1(k) > r_c(k)$, then $u_1(k) = u_1(k-1)$, and $u_2(k) = u_2(k-1)$, where $u_1(k)$ is the first cutoff frequency at the k-th iteration, and $u_1(k-1)$ is the first cutoff frequency at the (k−1)-th iteration. $u_2(k)$ is the second cutoff frequency at the k-th iteration, and $u_2(k-1)$ is the second cutoff frequency at the (k−1)-th iteration. $r_c(k) = (u_1(k) + u_2(k))/2$.

It may be understood that $$u(k) = u(k-1) + \frac{\rho \hat{\varphi}(k)^T(r^*(k) - r(k-1))}{\lambda(k-1) + \|\hat{\varphi}(k)\|^2}$$

may be derived from $$r(k) = r(k-1) + \hat{\varphi}(k)\Delta u(k) \text{ and } \frac{\partial J(u(k))}{\partial u(k)} = 0,$$

where $J(u(k)) = \|r^*(k) - r(k)\|^2 + \lambda(k-1)\|u(k) - u(k-1)\|^2,$ and $\lambda(k-1) > 0$.

In addition, $r(k) = r(k-1) + \hat{\varphi}(k)\Delta u(k)$ may be derived from $\Delta r(k) = \hat{\varphi}(k)\Delta u(k)$.

$\varphi(k) = [\varphi_1(k), \varphi_2(k)]$, where $\varphi(k)$ is called the pseudo partial derivative (PPD) at the k-th iteration, $\|\varphi(k)\| \leq b$ are bounded for all k, and b is a positive integer. It is understood that $\hat{\varphi}(k)$ may be an estimated value of $\varphi(k)$.

$\Delta r(k) = r(k) - r(k-1)$, $\Delta u(k) = u(k) - u(k-1)$, $\Delta u(k) \neq 0$, and $r(k) = f(r(k-1), \ldots, r(k-n_p), u(k), \ldots, u(k-n_s))$.

It should be noted that for $r(k) = f(r(k-1), \ldots, r(k-n_p), u(k), \ldots, u(k-n_s))$, the following condition are satisfied: condition 1: $r(k) = f(r(k-1), \ldots, r(k-n_p), u(k), \ldots, u(k-n_s))$ is observable and controllable; condition 2: the partial derivatives of the function $f$ with respect to all $u$ are continuous; condition 3: $r(k)=f(r(k-1), \ldots, r(k-n_p), u(k), \ldots, u(k-n_s))$ satisfies the generalized Lipschitz condition, i.e., for any k, $|\Delta r(k)| \leq b \|\Delta u(k)\|$.

Figure 10:
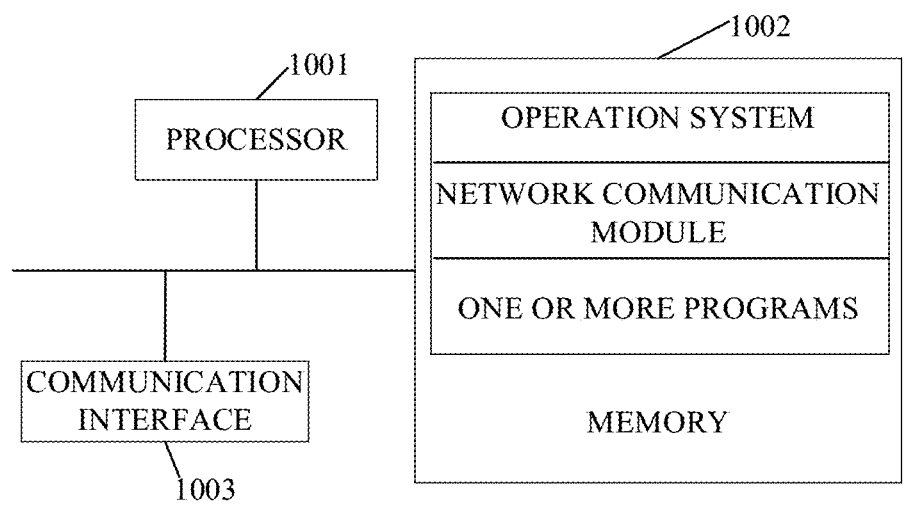
FIG. 10 is a schematic structural diagram of an electronic device of the hardware operation environment involved in embodiments of the present disclosure.

Referring to FIG. 10, FIG. 10 is a schematic structural diagram of an electronic device in the hardware operation environment involved in embodiments of the present disclosure.

The embodiments of the present disclosure provide an electronic device for signal processing, including a processor, a memory, a communication interface, and one or more programs, where the one or more programs are stored in the memory and are configured to be executed by the processor to execute instructions including the steps in any of the signal processing methods. As shown in FIG. 10, the electronic device in the hardware operation environment involved in embodiments of the present disclosure may include a processor 1001, a memory 1002, and a communication interface 1003.

For example, the processor 1001 is a CPU.

Optionally, the memory may be a high-speed RAM memory or a stable memory, such as a disk memory.

The communication interface 1003 is configured to achieve connection and communication between the processor 1001 and the memory 1002.

It will be understood by those skilled in the art that the structure of the electronic device illustrated in FIG. 10 does not constitute a limitation thereof, and may include more or fewer components than illustrated, or a combination of certain components, or a different arrangement of components.

As shown in FIG. 10, the memory 1002 may include an operating system, a network communication module, and one or more programs. The operating system is a program that manages and controls the hardware and software resources of the server and supports the operation of one or more programs. The network communication module is configured to enable communication between components within the memory 1002, as well as with other hardware and software within the electronic device.

In the electronic device shown in FIG. 10, the processor 1001 is configured to execute one or more programs in the memory 1002 to implementing the following:

receiving a first signal;
processing the first signal to obtain a squared complex envelope of the first signal;
obtaining a second signal by processing the squared complex envelope of the first signal using a first filter, where a cutoff frequency of the first filter is determined according to an average-to-peak power ratio of a squared complex envelope spectrum of a third signal, the third signal is obtained by processing the first signal using a second filter, and a cutoff frequency of the second filter is determined according to a bandwidth occupied by the first signal;
determining a squared complex envelope spectrum of the second signal; and
determining a symbol rate corresponding to the first signal according to the squared complex envelope spectrum of the second signal.

Specific implementations of the electronic device involved in this disclosure can be found in the respective embodiments of the signal processing methods described above and will not be repeated here.

The present disclosure also provides a computer-readable storage medium, the computer-readable storage medium is configured for storing a computer program, the stored computer program being executed by a processor to achieve:

receiving a first signal;
processing the first signal to obtain a squared complex envelope of the first signal;
obtaining a second signal by processing the squared complex envelope of the first signal using a first filter, where a cutoff frequency of the first filter is determined according to an average-to-peak power ratio of a squared complex envelope spectrum of a third signal, the third signal is obtained by processing the first signal using a second filter, and a cutoff frequency of the second filter is determined according to a bandwidth occupied by the first signal;
determining a squared complex envelope spectrum of the second signal; and
determining a symbol rate corresponding to the first signal according to the squared complex envelope spectrum of the second signal.

Specific implementations of the computer-readable storage medium involved in this disclosure can be found in the respective embodiments of the signal processing method described above and will not be repeated here.

It should be noted that each of the preceding method embodiments is presented as a series of combinations of actions for simplicity of description, but it should be noted by those skilled in the art that the present disclosure is not limited by the sequence of actions described, as some steps may be performed in other sequences or simultaneously according to the present disclosure. Secondly, the person skilled in the art should also be aware that the embodiments described in the specification are some embodiments and that the actions and modules involved are not necessarily required for the present disclosure.

The above embodiments are only for illustration of the technical solutions of the disclosure rather than limit the disclosure. Despite the detailed description of this disclosure with reference to the foregoing embodiments, it should be understood by those of ordinary skill in the art that it is still possible to modify the technical solutions recorded in the foregoing embodiments or to make equivalent substitutions for some of the technical features therein; and these modifications or substitutions do not make the essence of the corresponding technical solutions depart from the scope of the technical solutions of the embodiments of the present disclosure.

The units illustrated above as separate components may or may not be physically separated, and the components displayed as units may or may not be physical units, i.e., they may be located in one place or may be distributed to multiple network units. Some or all of these units can be selected according to practical needs to achieve the purpose of the solutions of the present disclosure. In addition, each functional unit in each embodiment of the present disclosure can be integrated in a single processing unit, or each unit can be physically present separately, or two or more units can be integrated in a single unit. The above integrated units can be implemented either in the form of hardware or in the form of software functional units.

The above integrated unit, when implemented as a software functional unit and sold or used as a separate product, may be stored in a computer-readable storage medium. It is understood that the technical solution of the present disclosure essentially or in part contributes to the prior art, or that all or part of the technical solution may be embodied in the form of a software product that is stored in a storage medium and includes a number of instructions to enable a computer device (which may be a personal computer, a cloud server, or an access network device, etc.) to perform all or part of the steps of the various embodiments of the method described above. The afore-mentioned storage medium includes USB flash drive, removable hard disk, Read-Only Memory (ROM), Random Access Memory (RAM), disk or CD-ROM, and other media that can store program code. The above mentioned is only a specific implementation of this disclosure, but the scope of protection of this disclosure is not limited to this, and any person skilled in the art can easily think of various equivalent modifications or substitutions within the technical scope disclosed in this disclosure, which should be covered by the scope of protection of this disclosure. Therefore, the scope of protection of this disclosure shall be subject to the scope of protection of the claims.

What is claimed is:

1. A signal processing method, comprising:
receiving a first signal;
processing the first signal to obtain a squared complex envelope of the first signal;
obtaining a second signal by processing the squared complex envelope of the first signal using a first filter, wherein a cutoff frequency of the first filter is determined according to an average-to-peak power ratio of a squared complex envelope spectrum of a third signal, the third signal is obtained by processing the first signal using a second filter, and a cutoff frequency of the second filter is determined according to a bandwidth occupied by the first signal;
determining a squared complex envelope spectrum of the second signal; and
determining a symbol rate corresponding to the first signal according to the squared complex envelope spectrum of the second signal.

2. The method of claim 1, wherein prior to obtaining the second signal by processing the squared complex envelope of the first signal using the first filter, the method further comprises:
performing Fourier transform on the first signal to obtain a first amplitude spectrum of the first signal;
filtering the first amplitude spectrum using a third filter to obtain a second amplitude spectrum;
determining a maximum value of the second amplitude spectrum; and
determining the bandwidth occupied by the first signal according to the maximum value of the second amplitude spectrum.

3. The method of claim 1, wherein the bandwidth occupied by the first signal satisfies a formula:

$$B_w = \max\left\{\arg\left[f:S(f)/S(m) = \frac{\sqrt{2}}{2}\right]\right\} - \min\left\{\arg\left[f:S(f)/S(m) = \frac{\sqrt{2}}{2}\right]\right\},$$

wherein $B_w$ represents the bandwidth occupied by the first signal, f represents a frequency of the first signal, $S(f)$ represents the second amplitude spectrum, and $S(m)$ represents the maximum value of the second amplitude spectrum.

4. The method of claim 1, wherein the cutoff frequency of the second filter comprises a first cutoff frequency and a second cutoff frequency, the first cutoff frequency is $$\frac{7B_w}{5f_s},$$

and the second cutoff frequency is $$\frac{12B_w}{5f_s},$$

wherein $f_s$ represents a sampling frequency of the first signal.

5. The method of claim 1, wherein the average-to-peak power ratio of the squared complex envelope spectrum of the third signal satisfies a formula:

$$r(k)=r(k-1)+\varphi(k)\Delta u(k),$$

wherein $r(k)$ represents an average-to-peak power ratio of the squared complex envelope spectrum of the third signal at a k-th iteration, $r(k-1)$ represents an average-to-peak power ratio of the squared complex envelope spectrum of the third signal at a (k−1)-th iteration, k is an integer greater than 1, $$\hat{\varphi}(k) = \hat{\varphi}(k-1) + \frac{\eta(\Delta r(k-1) - \hat{\varphi}(k-1)\Delta u(k-1))\Delta u(k-1)^T}{\mu(k-1) + \|\Delta u(k-1)\|^2},$$

$\eta$ is 2, $$\mu(k) = \mu(k-1) - \beta_2 \left[\frac{\partial J(\hat{\varphi}(k))}{\partial \hat{\varphi}(k)}\right]\left[\frac{\partial \hat{\varphi}(k)}{\partial \mu(k-1)}\right]^T,$$

$\beta_2$ is 0.05, $$\frac{\partial \hat{\varphi}(k)}{\partial \mu(k-1)} = -\frac{\eta(\Delta r(k-1) - \hat{\varphi}(k-1)\Delta u(k-1))\Delta u(k-1)^T}{(\mu(k-1) + \|\Delta u(k-1)\|^2)^2},$$

$$\frac{\partial J(\hat{\varphi}(k))}{\partial \hat{\varphi}(k)} =$$

$$2(\hat{\varphi}(k)\Delta u(k-1) - \Delta r(k-1))\Delta u(k-1)^T + 2\mu(k-1)(\hat{\varphi}(k) - \hat{\varphi}(k-1)),$$

$$\Delta u(k) = u(k) - u(k-1), \Delta u(k) \neq 0,$$

$u(k)$ represents a cutoff frequency of the first filter at the k-th iteration, and $u(k-1)$ represents a cutoff frequency of the first filter at the (k−1)-th iteration.

6. The method of claim 5, wherein if $\|\hat{\varphi}(k)\|^2 \leq \sigma$, or $\|\Delta u(k)\|^2 \leq \sigma$, or $\{\text{sign}(\varphi_i(k)) \neq \text{sign}(\varphi_i(1))\}_{i=1}^2$, then $\hat{\varphi}(k)=\hat{\varphi}(1)$, wherein $\hat{\varphi}(1)$ is an initial value of $\hat{\varphi}(k)$ and $\sigma=10^{-5}$.

7. The method of claim 5, wherein $$u(k) = u(k-1) + \frac{\rho\hat{\varphi}(k)^T(r^*(k) - r(k-1))}{\lambda(k-1) + \|\hat{\varphi}(k)\|^2},$$

wherein $\rho$ is 1, $r^*(k) = 0.08$, $$\lambda(k) = \lambda(k-1) - \beta_1\left[\frac{\partial J(u(k))}{\partial u(k)}\right]^T\left[\frac{\partial u(k)}{\partial \lambda(k-1)}\right], \beta_1 = 0.05,$$

$$\frac{\partial J(u(k))}{\partial u(k)} = 2(\hat{\varphi}(k)\Delta u(k) + r(k-1) - r^*(k))\hat{\varphi}(k)^T + 2\lambda(k-1)\Delta u(k),$$

and $$\frac{\partial (u(k))}{\partial \lambda(k-1)} = -\frac{\rho\hat{\varphi}(k)^T(r^*(k) - r(k-1))}{(\lambda(k-1) + \|\hat{\varphi}(k)\|^2)^2}.$$

8. An electronic device for signal processing, comprising a processor, a memory, a communication interface, and one or more programs, wherein the one or more programs are stored in the memory and when executed by the processor, cause the processor to:

19 receive a first signal;

process the first signal to obtain a squared complex envelope of the first signal;

obtain a second signal by processing the squared complex envelope of the first signal using a first filter, wherein a cutoff frequency of the first filter is determined according to an average-to-peak power ratio of a squared complex envelope spectrum of a third signal, the third signal is obtained by processing the first signal using a second filter, and a cutoff frequency of the second filter is determined according to a bandwidth occupied by the first signal;

determine a squared complex envelope spectrum of the second signal; and determine a symbol rate corresponding to the first signal according to the squared complex envelope spectrum of the second signal.

9. The electronic device of claim 8, wherein the one or more programs, when executed by the processor, further causes the processor to:

perform Fourier transform on the first signal to obtain a first amplitude spectrum of the first signal;

filter the first amplitude spectrum using a third filter to obtain a second amplitude spectrum;

determine a maximum value of the second amplitude spectrum; and determine the bandwidth occupied by the first signal according to the maximum value of the second amplitude spectrum.

10. The electronic device of claim 8, wherein the bandwidth occupied by the first signal satisfies a formula:

$$B_w = \max\left\{\arg\left[f:S(f)/S(m) = \frac{\sqrt{2}}{2}\right]\right\} - \min\left\{\arg\left[f:S(f)/S(m) = \frac{\sqrt{2}}{2}\right]\right\},$$

wherein $B_w$ represents the bandwidth occupied by the first signal, f represents a frequency of the first signal, S(f) represents the second amplitude spectrum, and S(m) represents the maximum value of the second amplitude spectrum.

11. The electronic device of claim 8, wherein the cutoff frequency of the second filter comprises a first cutoff frequency and a second cutoff frequency, the first cutoff frequency is $$\frac{7B_w}{5f_s},$$

and the second cutoff frequency is $$\frac{12B_w}{5f_s},$$

wherein $f_s$ represents a sampling frequency of the first signal.

12. The electronic device of claim 8, wherein the average-to-peak power ratio of the squared complex envelope spectrum of the third signal satisfies a formula:

$$r(k)=r(k-1)+\hat{\varphi}(k)\Delta u(k),$$

wherein r (k) represents an average-to-peak power ratio of the squared complex envelope spectrum of the third signal at a k-th iteration, r(k−1) represents an average-

20 to-peak power ratio of the squared complex envelope spectrum of the third signal at a (k−1)-th iteration, k is an integer greater than 1, $$\hat{\varphi}(k) = \hat{\varphi}(k-1) + \frac{\eta(\Delta r(k-1) - \hat{\varphi}(k-1)\Delta u(k-1))\Delta u(k-1)^T}{\mu(k-1) + \|\Delta u(k-1)\|^2},$$

$\eta$ is 2, $$\mu(k) = \mu(k-1) - \beta_2\left[\frac{\partial J(\hat{\varphi}(k))}{\partial \hat{\varphi}(k)}\right]\left[\frac{\partial \hat{\varphi}(k)}{\partial \mu(k-1)}\right]^T,$$

$\beta_2$ is 0.05, $$\frac{\partial \hat{\varphi}(k)}{\partial \mu(k-1)} = -\frac{\eta(\Delta r(k-1) - \hat{\varphi}(k-1)\Delta u(k-1))\Delta u(k-1)^T}{(\mu(k-1) + \|\Delta u(k-1)\|^2)^2},$$

$$\frac{\partial J(\hat{\varphi}(k))}{\partial \hat{\varphi}(k)} =$$

$2(\hat{\varphi}(k)\Delta u(k-1) - \Delta r(k-1))\Delta u(k-1)^T + 2\mu(k-1)(\hat{\varphi}(k) - \hat{\varphi}(k-1)),$ $\Delta u(k) = u(k) - u(k-1), \Delta u(k) \neq 0,$ u(k) represents a cutoff frequency of the first filter at the k-th iteration, and u(k−1) represents a cutoff frequency of the first filter at the (k−1)-th iteration.

13. The electronic device of claim 12, wherein if $\|\ddot{\varphi}(k)\|^2 \leq \sigma$, or $\|\Delta u(k)\|^2 \leq \sigma$, or $\{\text{sign}(\varphi_i(k)) \neq \text{sign}(\varphi_i(1))\}_{i=1}^2$, then $\hat{\varphi}(k)=\hat{\varphi}(1)$, wherein $\hat{\varphi}(1)$ is an initial value of $\hat{\varphi}(k)$ and $\sigma=10^{-5}$.

14. The electronic device of claim 12, wherein $$u(k) = u(k-1) + \frac{\rho\hat{\varphi}(k)^T(r^*(k) - r(k-1))}{\lambda(k-1) + \|\hat{\varphi}(k)\|^2},$$

wherein $\rho$ is 1, $r^*(k) = 0.08$, $$\lambda(k) = \lambda(k-1) - \beta_1\left[\frac{\partial J(u(k))}{\partial u(k)}\right]^T\left[\frac{\partial u(k)}{\partial \lambda(k-1)}\right], \beta_1 = 0.05,$$

$$\frac{\partial J(u(k))}{\partial u(k)} = 2(\hat{\varphi}(k)\Delta u(k) + r(k-1) - r^*(k))\hat{\varphi}(k)^T + 2\lambda(k-1)\Delta u(k),$$

and $\frac{\partial(u(k))}{\partial \lambda(k-1)} = -\frac{\rho\hat{\varphi}(k)^T(r^*(k) - r(k-1))}{(\lambda(k-1) + \|\hat{\varphi}(k)\|^2)^2}.$ 15. A non-transitory computer-readable storage medium for storing a computer program which, when executed by a processor, causes the processor to:

receive a first signal;

process the first signal to obtain a squared complex envelope of the first signal;

obtain a second signal by processing the squared complex envelope of the first signal using a first filter, wherein a cutoff frequency of the first filter is determined according to an average-to-peak power ratio of a squared complex envelope spectrum of a third signal, the third signal is obtained by processing the first signal using a second filter, and a cutoff frequency of the second filter is determined according to a bandwidth occupied by the first signal;

determine a squared complex envelope spectrum of the second signal; and determine a symbol rate corresponding to the first signal according to the squared complex envelope spectrum of the second signal.

16. The non-transitory computer-readable storage medium of claim 15, wherein the computer program, when executed by the processor, further causes the processor to:

perform Fourier transform on the first signal to obtain a first amplitude spectrum of the first signal;

filter the first amplitude spectrum using a third filter to obtain a second amplitude spectrum;

determine a maximum value of the second amplitude spectrum; and determine the bandwidth occupied by the first signal according to the maximum value of the second amplitude spectrum.

17. The non-transitory computer-readable storage medium of claim 15, wherein the bandwidth occupied by the first signal satisfies a formula:

$$B_w = \max\left\{\arg\left[f:S(f)/S(m) = \frac{\sqrt{2}}{2}\right]\right\} - \min\left\{\arg\left[f:S(f)/S(m) = \frac{\sqrt{2}}{2}\right]\right\},$$

wherein $B_w$ represents the bandwidth occupied by the first signal, f represents a frequency of the first signal, $S(f)$ represents the second amplitude spectrum, and $S(m)$ represents the maximum value of the second amplitude spectrum.

18. The non-transitory computer-readable storage medium of claim 15, wherein the cutoff frequency of the second filter comprises a first cutoff frequency and a second cutoff frequency, the first cutoff frequency is $$\frac{7B_w}{5f_s},$$

and the second cutoff frequency is $$\frac{12B_w}{5f_s},$$

wherein $f_s$ represents a sampling frequency of the first signal.

19. The non-transitory computer-readable storage medium of claim 15, wherein the average-to-peak power ratio of the squared complex envelope spectrum of the third signal satisfies a formula:

$$r(k) = r(k-1) + \hat{\varphi}(k)\Delta u(k),$$

wherein r(k) represents an average-to-peak power ratio of the squared complex envelope spectrum of the third signal at a k-th iteration, r(k−1) represents an average-to-peak power ratio of the squared complex envelope spectrum of the third signal at a (k−1)-th iteration, k is an integer greater than 1, $$\hat{\varphi}(k) = \hat{\varphi}(k-1) + \frac{\eta(\Delta r(k-1) - \hat{\varphi}(k-1)\Delta u(k-1))\Delta u(k-1)^T}{\mu(k-1) + \|\Delta u(k-1)\|^2},$$

$\eta$ is 2, $$\mu(k) = \mu(k-1) - \beta_2 \left[\frac{\partial J(\hat{\varphi}(k))}{\partial \hat{\varphi}(k)}\right]\left[\frac{\partial \hat{\varphi}(k)}{\partial \mu(k-1)}\right]^T,$$

$\beta_2$ is 0.05, $$\frac{\partial \hat{\varphi}(k)}{\partial \mu(k-1)} = -\frac{\eta(\Delta r(k-1) - \hat{\varphi}(k-1)\Delta u(k-1))\Delta u(k-1)^T}{(\mu(k-1) + \|\Delta u(k-1)\|^2)^2},$$

$$\frac{\partial J(\hat{\varphi}(k))}{\partial \hat{\varphi}(k)} =$$

$$2(\hat{\varphi}(k)\Delta u(k-1) - \Delta r(k-1))\Delta u(k-1)^T + 2\mu(k-1)(\hat{\varphi}(k) - \hat{\varphi}(k-1)),$$

$$\Delta u(k) = u(k) - u(k-1), \Delta u(k) \neq 0,$$

u(k) represents a cutoff frequency of the first filter at the k-th iteration, and u(k−1) represents a cutoff frequency of the first filter at the (k−1)-th iteration.

20. The non-transitory computer-readable storage medium of claim 19, wherein if $\|\hat{\varphi}(k)\|^2 \leq \sigma$, or $\|\Delta u(k)\|^2 < \sigma$, or $\{\text{sign}(\varphi_i(k)) \neq \text{sign}(\varphi_i(1))\}_{i=1}^2$, then $\hat{\varphi}(k) = \hat{\varphi}(1)$, wherein $\hat{\varphi}(1)$ is an initial value of $\hat{\varphi}(k)$ and $\sigma = 10^{-5}$.

* * * * *